(12) United States Patent
Nores et al.

(10) Patent No.: US 8,996,394 B2
(45) Date of Patent: Mar. 31, 2015

(54) SYSTEM AND METHOD FOR ENABLING DECISION ACTIVITIES IN A PROCESS MANAGEMENT AND DESIGN ENVIRONMENT

(75) Inventors: Juan Cruz Nores, Buenos Aires (AR); Emilio Lopez-Gabeiras, Pilar (AR); Fernando Javier Rodriguez Olivera, La Matanza (AR)

(73) Assignee: Oracle International Corporation, Redwood Shores, CA (US)

( * ) Notice: Subject to any disclaimer, the term of this patent is extended or adjusted under 35 U.S.C. 154(b) by 1527 days.

(21) Appl. No.: 11/937,390

(22) Filed: Nov. 8, 2007

(65) Prior Publication Data
US 2008/0288304 A1   Nov. 20, 2008

Related U.S. Application Data

(60) Provisional application No. 60/938,976, filed on May 18, 2007.

(51) Int. Cl.
*G06Q 10/00* (2012.01)
*G06Q 10/06* (2012.01)

(52) U.S. Cl.
CPC .............. *G06Q 10/06* (2013.01); *G06Q 10/063* (2013.01); *G06Q 10/06316* (2013.01); *G06Q 10/0633* (2013.01)
USPC ......................... 705/7.15; 705/7.11; 705/7.12

(58) Field of Classification Search
CPC .................... G06F 1/00–21/00; G06F 1/2101; G06F 1/22; G06F 1/2201; G06Q 10/00–50/00; G06Q 90/00; G06Q 99/00; G06Q 10/222; G06Q 10/223

USPC ................................................ 705/7.11–7.42
See application file for complete search history.

(56) References Cited

U.S. PATENT DOCUMENTS 3,790,939 A   2/1974   Constant
4,604,686 A   8/1986   Reiter et al.
(Continued)

FOREIGN PATENT DOCUMENTS

WO   9105417   4/1991

OTHER PUBLICATIONS

U.S. Appl. No. 10/050,319, filed Jan. 15, 2002, entitled "Introspection Module for Business Process Development and Execution," 75 pages.
(Continued)

*Primary Examiner* — Alan S Miller
(74) *Attorney, Agent, or Firm* — Meyer IP Law Group

(57) ABSTRACT

A set of decision activities can be provided to a business process management and design software tool. The tool can be used to define various processes that contain one or more activities linked by transitions. During process design time, a business analyst can identify process-relevant data of the process to be presented to the end users. The relevant data can be rendered to the end users at runtime, along with a set of possible options for the activities in a process instance. Upon receiving a decision of the user, the process instance can follow the selected transition to a different activity. Over time, the system can capture the decisions taken by users and enter the data associated with these decisions into a data classifier. In doing so, the software tool can generate suggestions, provide probabilities, automate and distribute workloads, flag abnormalities and deviations and generally improve process design and management.

20 Claims, 6 Drawing Sheets

(56) References Cited

U.S. PATENT DOCUMENTS

| Patent No. | Date | Name | Ref |
|---|---|---|---|
| 4,975,914 A | 12/1990 | Ashton | |
| 5,109,515 A | 4/1992 | Laggis | |
| 5,182,793 A * | 1/1993 | Alexander et al. | 706/13 |
| 5,224,098 A | 6/1993 | Bird | |
| 5,249,293 A | 9/1993 | Schreiber et al. | |
| 5,265,250 A | 11/1993 | Andrade et al. | |
| 5,280,610 A | 1/1994 | Travis et al. | |
| 5,329,619 A | 7/1994 | Page et al. | |
| 5,513,339 A | 4/1996 | Agrawal et al. | |
| 5,546,549 A | 8/1996 | Barrett et al. | |
| 5,628,016 A | 5/1997 | Kukol | |
| 5,701,305 A | 12/1997 | Albrecht | |
| 5,734,837 A * | 3/1998 | Flores et al. | 705/7.13 |
| 5,784,613 A | 7/1998 | Tamirisa | |
| 5,805,914 A | 9/1998 | Wise et al. | |
| 5,828,832 A | 10/1998 | Holden et al. | |
| 5,835,087 A | 11/1998 | Herz et al. | |
| 5,931,917 A | 8/1999 | Nguyen et al. | |
| 5,974,568 A | 10/1999 | McQueen | |
| 6,018,805 A | 1/2000 | Ma et al. | |
| 6,029,195 A | 2/2000 | Herz | |
| 6,058,391 A | 5/2000 | Gardner | |
| 6,065,055 A | 5/2000 | Hughes et al. | |
| 6,134,680 A | 10/2000 | Yeomans | |
| 6,195,676 B1 | 2/2001 | Spix et al. | |
| 6,209,018 B1 | 3/2001 | Ben-Shachar et al. | |
| 6,212,640 B1 | 4/2001 | Abdeinur et al. | |
| 6,226,677 B1 | 5/2001 | Slemmer | |
| 6,226,752 B1 | 5/2001 | Gupta et al. | |
| 6,314,512 B1 | 11/2001 | Branson et al. | |
| 6,374,144 B1 | 4/2002 | Viviani et al. | |
| 6,415,246 B1 | 7/2002 | Snyder | |
| 6,434,740 B1 * | 8/2002 | Monday et al. | 717/108 |
| 6,516,411 B2 | 2/2003 | Smith | |
| 6,542,841 B1 | 4/2003 | Snyder | |
| 6,542,908 B1 * | 4/2003 | Ims | 1/1 |
| 6,553,563 B2 * | 4/2003 | Ambrose et al. | 717/116 |
| 6,601,234 B1 * | 7/2003 | Bowman-Amuah | 717/108 |
| 6,604,140 B1 | 8/2003 | Beck et al. | |
| 6,615,216 B1 | 9/2003 | Hu | |
| 6,618,737 B2 | 9/2003 | Aridor et al. | |
| 6,618,817 B1 | 9/2003 | Armstrong | |
| 6,622,260 B1 | 9/2003 | Marisetty et al. | |
| 6,631,362 B1 * | 10/2003 | Ullman et al. | 706/60 |
| 6,631,519 B1 * | 10/2003 | Nicholson et al. | 717/169 |
| 6,643,652 B2 | 11/2003 | Helgeson et al. | |
| 6,665,262 B1 | 12/2003 | Lindskog et al. | |
| 6,671,728 B1 | 12/2003 | Mayberry | |
| 6,681,220 B1 | 1/2004 | Kaplan et al. | |
| 6,684,387 B1 * | 1/2004 | Acker et al. | 717/126 |
| 6,718,376 B1 | 4/2004 | Chu et al. | |
| 6,721,779 B1 | 4/2004 | Maffeis | |
| 6,754,659 B2 * | 6/2004 | Sarkar et al. | 1/1 |
| 6,801,916 B2 | 10/2004 | Roberge et al. | |
| 6,826,568 B2 | 11/2004 | Bernstein et al. | |
| 6,836,889 B1 * | 12/2004 | Chan et al. | 719/310 |
| 6,868,441 B2 | 3/2005 | Greene et al. | |
| 6,909,903 B2 | 6/2005 | Wang | |
| 6,918,058 B2 | 7/2005 | Miura et al. | |
| 6,918,059 B1 | 7/2005 | Galuten et al. | |
| 6,944,623 B2 | 9/2005 | Kim | |
| 6,947,984 B2 | 9/2005 | Schweitzer et al. | |
| 6,950,845 B2 | 9/2005 | Givoly | |
| 6,954,220 B1 | 10/2005 | Bowman-Amuah | |
| 6,959,307 B2 * | 10/2005 | Apte | 1/1 |
| 6,973,460 B1 | 12/2005 | Mitra | |
| 6,993,683 B2 | 1/2006 | Bhat et al. | |
| 7,017,175 B2 | 3/2006 | Alao et al. | |
| 7,035,202 B2 | 4/2006 | Callon | |
| 7,062,749 B2 | 6/2006 | Cyr et al. | |
| 7,076,508 B2 | 7/2006 | Bourbonnais et al. | |
| 7,086,066 B2 | 8/2006 | Kappel et al. | |
| 7,092,928 B1 | 8/2006 | Elad et al. | |
| 7,117,504 B2 | 10/2006 | Smith et al. | |
| 7,146,544 B2 | 12/2006 | Hsu et al. | |
| 7,149,734 B2 * | 12/2006 | Carlson et al. | 1/1 |
| 7,155,447 B2 | 12/2006 | Roberge et al. | |
| 7,162,721 B2 * | 1/2007 | Ali et al. | 719/310 |
| 7,165,097 B1 | 1/2007 | Mackin et al. | |
| 7,168,014 B2 | 1/2007 | Ghosh et al. | |
| 7,171,672 B2 | 1/2007 | Just | |
| 7,180,866 B1 | 2/2007 | Chartre et al. | |
| 7,181,684 B2 | 2/2007 | Chittu et al. | |
| 7,185,060 B2 | 2/2007 | Christensen et al. | |
| 7,191,381 B2 | 3/2007 | Gesbert et al. | |
| 7,203,635 B2 * | 4/2007 | Oliver et al. | 703/22 |
| 7,206,974 B2 | 4/2007 | Kozlov et al. | |
| 7,236,546 B2 | 6/2007 | Egnor et al. | |
| 7,242,925 B2 | 7/2007 | O'Neil et al. | |
| 7,243,267 B2 | 7/2007 | Klemm et al. | |
| 7,289,964 B1 | 10/2007 | Bowman-Amuah | |
| 7,373,563 B2 | 5/2008 | Noy et al. | |
| 7,376,959 B2 | 5/2008 | Warshavsky et al. | |
| 7,380,166 B2 | 5/2008 | Thatte et al. | |
| 7,403,904 B2 * | 7/2008 | Abe et al. | 705/7.29 |
| 7,406,030 B1 | 7/2008 | Rijsman | |
| 7,467,145 B1 * | 12/2008 | Castellanos et al. | 1/1 |
| 7,502,716 B2 | 3/2009 | Bourne et al. | |
| 7,562,339 B2 | 7/2009 | Racca | |
| 7,603,674 B2 | 10/2009 | Cyr et al. | |
| 7,624,404 B2 | 11/2009 | Yagi | |
| 7,706,964 B2 * | 4/2010 | Horvitz et al. | 701/117 |
| 7,739,208 B2 * | 6/2010 | George et al. | 706/16 |
| 7,797,450 B2 | 9/2010 | Xie et al. | |
| 2001/0007984 A1 | 7/2001 | Fattah et al. | |
| 2001/0010053 A1 | 7/2001 | Ben-Shachar et al. | |
| 2001/0051949 A1 | 12/2001 | Carey et al. | |
| 2002/0049621 A1 * | 4/2002 | Bruce | 705/7 |
| 2002/0059345 A1 | 5/2002 | Wang et al. | |
| 2002/0099818 A1 | 7/2002 | Russell et al. | |
| 2002/0120711 A1 | 8/2002 | Bantz et al. | |
| 2002/0152254 A1 * | 10/2002 | Teng | 709/100 |
| 2002/0160745 A1 | 10/2002 | Wang | |
| 2002/0186128 A1 | 12/2002 | Amano et al. | |
| 2002/0188616 A1 * | 12/2002 | Chinnici et al. | 707/102 |
| 2003/0018732 A1 | 1/2003 | Jacobs et al. | |
| 2003/0025599 A1 | 2/2003 | Monroe | |
| 2003/0033346 A1 | 2/2003 | Carlson et al. | |
| 2003/0033351 A1 | 2/2003 | Ricciardi | |
| 2003/0051190 A1 | 3/2003 | Marisetty et al. | |
| 2003/0065726 A1 | 4/2003 | Wells et al. | |
| 2003/0093479 A1 | 5/2003 | Mellen-Garnett et al. | |
| 2003/0105800 A1 | 6/2003 | Cullen | |
| 2003/0135556 A1 | 7/2003 | Holdsworth | |
| 2003/0142680 A1 | 7/2003 | Oguchi | |
| 2003/0149934 A1 | 8/2003 | Worden | |
| 2003/0154265 A1 | 8/2003 | Raffaele et al. | |
| 2003/0163646 A1 | 8/2003 | O'Neil | |
| 2003/0167296 A1 | 9/2003 | Todd | |
| 2003/0172145 A1 | 9/2003 | Nguyen | |
| 2003/0172368 A1 * | 9/2003 | Alumbaugh et al. | 717/106 |
| 2003/0191679 A1 * | 10/2003 | Casati et al. | 705/8 |
| 2003/0195997 A1 | 10/2003 | Ibert et al. | |
| 2003/0212987 A1 * | 11/2003 | Demuth et al. | 717/130 |
| 2003/0236689 A1 * | 12/2003 | Casati et al. | 705/7 |
| 2004/0001514 A1 | 1/2004 | Wookey et al. | |
| 2004/0002838 A1 * | 1/2004 | Oliver et al. | 703/2 |
| 2004/0019465 A1 | 1/2004 | Kerr et al. | |
| 2004/0019835 A1 | 1/2004 | Marisetty et al. | |
| 2004/0073782 A1 | 4/2004 | Price et al. | |
| 2004/0081178 A1 | 4/2004 | Fujimori | |
| 2004/0093381 A1 | 5/2004 | Hodges et al. | |
| 2004/0095833 A1 | 5/2004 | Marisetty et al. | |
| 2004/0098484 A1 | 5/2004 | Wuebker | |
| 2004/0117435 A1 | 6/2004 | Rossmanith et al. | |
| 2004/0143625 A1 | 7/2004 | Sheinis et al. | |
| 2004/0163088 A1 | 8/2004 | Frender et al. | |
| 2004/0168184 A1 | 8/2004 | Steenkamp et al. | |
| 2004/0181543 A1 | 9/2004 | Wu et al. | |
| 2004/0225670 A1 | 11/2004 | Cameron et al. | |
| 2005/0015462 A1 | 1/2005 | Lee et al. | |
| 2005/0015773 A1 | 1/2005 | Gorman et al. | |
| 2005/0021348 A1 * | 1/2005 | Chan et al. | 705/1 |
| 2005/0021751 A1 | 1/2005 | Block et al. | |

(56) References Cited

U.S. PATENT DOCUMENTS

| | | | |
|---|---|---|---|
| 2005/0021772 | A1 | 1/2005 | Shedrinsky |
| 2005/0080930 | A1 | 4/2005 | Joseph |
| 2005/0108246 | A1 | 5/2005 | Dillon |
| 2005/0120106 | A1 | 6/2005 | Albertao |
| 2005/0149517 | A1 | 7/2005 | Cosic |
| 2005/0160434 | A1 | 7/2005 | Tan et al. |
| 2005/0182787 | A1 | 8/2005 | Oswalt |
| 2005/0188079 | A1 | 8/2005 | Motsinger et al. |
| 2005/0204214 | A1 | 9/2005 | Welch |
| 2005/0234758 | A1* | 10/2005 | Nishi ............................. 705/8 |
| 2005/0234969 | A1 | 10/2005 | Mamou et al. |
| 2005/0240621 | A1 | 10/2005 | Robertson et al. |
| 2005/0278335 | A1 | 12/2005 | Patrick et al. |
| 2006/0064483 | A1 | 3/2006 | Patel |
| 2006/0069717 | A1 | 3/2006 | Mamou et al. |
| 2006/0095815 | A1 | 5/2006 | Noy et al. |
| 2006/0106637 | A1* | 5/2006 | Johnson et al. ................ 705/1 |
| 2006/0150156 | A1 | 7/2006 | Cyr et al. |
| 2007/0106761 | A1 | 5/2007 | Beoughter et al. |
| 2007/0226682 | A1* | 9/2007 | Kilgore et al. ............... 717/106 |
| 2008/0114710 | A1* | 5/2008 | Pucher .......................... 706/20 |
| 2008/0133320 | A1* | 6/2008 | Gluhovsky et al. ........... 705/10 |
| 2008/0235934 | A1* | 10/2008 | Burnett et al. ................ 29/557 |

OTHER PUBLICATIONS

U.S. Appl. No. 10/050,577, filed Jan. 15, 2002, entitled "A Debugger for Business Process Development and Execution," 74 pages.

U.S. Appl. No. 10/050,374, filed Jan. 15, 2002, entitled "Analytical Data Browser for Business Process Development and Execution," 75 pages.

Australian Patent Office Search Report for SG200600938-5, dated Oct. 4, 2007, 7 pages.

"<rethrow>", cafe.bevocal.com definition, retrieved from <http://www.archive.org/web/20030405195631/cafe.bevocal.com/docs/vxml/rethrow.html>, Apr. 5, 2003, 2 pages.

Andera, "When is a Throw not a Rethrow?", Craig Andera's Weblog, <http://www.pluralsight.com/blogs/craig/archive/2003/08/04/900.aspx>, Aug. 4, 2003, 7 pages.

International Search Report and Written Opinion for PCT/US08/63983 dated Aug. 1, 2008, 7 pages.

Mangtani, Nitin, et al., "Liquid Data: XQuery-Based Enterprise Information Integration," downloaded from http://dev2dev.bea.com/lpt/a/186 on May 16, 2005, 9 pages (Nov. 18, 2004).

Krill, Paul, "ComputerWorld—Driving the Enterprise Service Bus," InfoWorld, 5 pages (Jun. 16, 2003).

BeaLiquid Data for WebLogic™, Concepts Guide, Version 8.1; Document Date: Jul. 2003; Revised: Dec. 2003; Part No. 886-002005-003.

The Most Cost Effective Solution for Data Integration: Application Router™ 1000, Cast Iron Systems—Rethink Integration; 2005 Cast Iron Systems, 7 pages; (last printed: May 31, 2005) http://www.castironsys.com/products.shtml.

Cast Iron Systems Platform, Version 2.3—Mar. 2004—Product Overview, 5 pages. 2004, Cast Iron Systems. http://www.castironsys.com.

Cast Iron Application Router™ 1000—Technical Brochure, 8 pages; 2004 Cast Iron Systems www.castironsys.com.

EntireX, XML-Powered Integration—White Paper; Software AG, The XML Company, 19 pages; Sep. 2002 www.softwareag.com.

Blue Titan Network Director, Blue Titan Software, 4 pages, 2003 Blue Titan, Inc. www.bluetitan.com.

Rethink Integration™ 2004 Cast Iron Systems. www.castironsys.com.

Sonic ESB Datasheet, 4 pages, 2004 Sonic Software Corporation, www.sonicsoftware.com.

Best-of-Breed ESBs, Identifying Best-of-Breed Characteristics in Enterprise Services Buses (ESBs), Jun. 2003, A White Paper from Steve Craggs, Vice-Chairman, EAI Industry Consortium, Sponsored by Sonic Software, 2003 Saint Consulting Limited.

International Search Report for PCT/US05/18183 dated Dec. 2, 2005, 2 pages.

* cited by examiner

SYSTEM AND METHOD FOR ENABLING DECISION ACTIVITIES IN A PROCESS MANAGEMENT AND DESIGN ENVIRONMENT

CLAIM OF PRIORITY

The present application claims the benefit of U.S. Provisional Patent Application No. 60/938,976, entitled SYSTEM AND METHOD FOR ENABLING DECISION ACTIVITIES IN A PROCESS MANAGEMENT AND DESIGN ENVIRONMENT, by Eduardo Carlos Rubio et al., filed on May 18, 2007, which is incorporated herein by reference in its entirety.

CROSS REFERENCE TO RELATED APPLICATIONS

The following commonly owned, co-pending United States Patent Applications are related to the present Application and are incorporated by reference herein in their entireties:

U.S. patent application Ser. No. 10/050,316 entitled SYSTEM ARCHITECTURE FOR BUSINESS PROCESS DEVELOPMENT AND EXECUTION, by Felix G. Racca, et al., filed on Jan. 15, 2002; and U.S. patent application Ser. No. 11/935,964 entitled SYSTEM AND METHOD FOR INTEGRATING A BUSINESS PROCESS MANAGEMENT SYSTEM WITH AN ENTERPRISE SERVICE BUS, by Alexandre Toussaint, et al., filed on Nov. 6, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to business process management software tools and design, and more particularly to providing decision activities in a process design environment.

BACKGROUND

In recent years, business process management (BPM) and enterprise resource planning (ERP) systems have become more and more widely used among various organizations. A business enterprise typically desires to integrate all of its data and processes into a single and unified system. For example, an organization may automate a business process by having a computer perform certain activities of the business, such as receiving a sales order, sending a notification to a client, or reminding a human participant of work that needs to be performed.

While automation of such business processes has posed a number of difficulties, software BPM systems have become ever increasingly important solutions to many organizations. By implementing software BPM suites, enterprises are becoming more and more able to increase productivity, performance, profits and decrease inefficiency due to various factors. Nevertheless, a multitude of inefficiencies and problems remain in the BPM software world. The inability of such systems to efficiently monitor and improve business processes before, during and after deployment can have significant impact to productivity. Furthermore, the lack of business intelligence in such systems can cause various disadvantages and shortcomings in an overall integration of an enterprise.

Within this context, the various decisions made by employees of a typical organization are often delegated to a person with some expertise or specialized knowledge of the subject matter. As an example, certain credit approval decisions are routed to an employee specializing in credit applications, red flags and alerts may be routed to a security specialist, new employee requests are directed to a human resource specialist and so on. In general, these persons are usually required to have significant experience and past knowledge of the material before being entrusted with the decision making in the process.

In light of this, it would be desirable for a business process management software system to infer and learn behavior from such experts as well as other employees, in order to provide guidance and direction to persons with less experience. It would also be advantageous to analyze, determine certainties and abnormalities, and route business processes in an optimal manner so as to increase the overall reliability and performance of a BPM system. Applicants have identified the foregoing, as well as other needs, which currently exist in the art, in coming to conceive the subject matter of the present disclosure.

DETAILED DESCRIPTION

Figure 1:
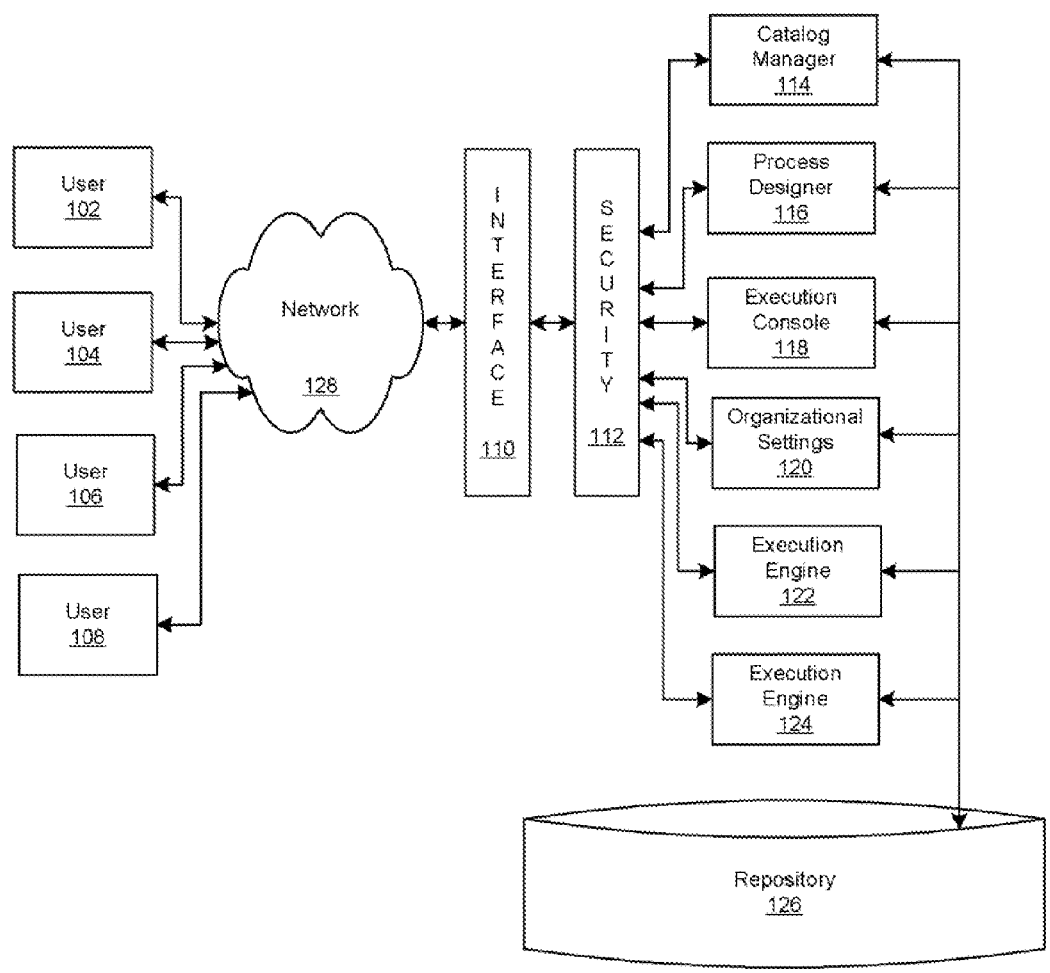
FIG. 1 is an illustration of an exemplary business process management system, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details will be set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for enabling decision activities in a process management and design environment. Decision activities can be an integral component of a process that is designed and executed via a business process management system. In some embodiments, decision activities can monitor the execution of such processes, infer behavior from expert users, provide suggestions based on historical data, flag deviations and abnormalities and cause other improvements to business integration.

In various embodiments, a system is described that includes a process designer module that can be used to draw a definition of a process. The process can be comprised of activities which are linked by various transitions. One type of such activities can be designated a decision activity type. In one embodiment, decision activities define a set of variables relevant to making a decision in the process where this set of variables will be presented to the user. Once the process is deployed, the end users can be presented with the designated variables and a set of options from which they may select a decision. This decision can dictate the transition that a business process instance of the system will follow. In one embodiment, an execution engine instantiates a process instance by executing its activities and, over a course of time, captures the decisions taken by that user in the process instance. From this collected data, various suggestions can be generated based on past decisions.

The system can further include an execution console that manages the execution of process instances by the engines, and a repository that maintains state data associated with each process instance (e.g. persistent variables and decisions of the process). Furthermore, the system can include an organizational settings module that populates the process with organization-specific values upon instantiation.

Decision activities can be a part of a business process management software suite deployed in an organization. In one embodiment, the decisions made by process users are collected by the BPM suite over a course of time and these decisions can be correlated with certain variables of the process that have been determined to be relevant in making such decisions. As an illustration, a customer's income and employment duration values may be relevant to a credit approval decision. By classifying the data and training the BPM system, a large amount of knowledge could be obtained about the performance of the business process. This knowledge can then be used to (1) suggest an appropriate decision in the process; (2) allow experts to decide that some decisions can be processed automatically if the prediction accuracy is above a certain rate; (3) detect the criticality of certain decisions, and if the decision is simple enough, assign it to the expert that is less qualified, saving on precious resources of the "most expert" participants; and (4) trigger exceptions when certain decisions deviate too much from the norm (abnormal behavior).

As a general overview of BPM systems, the term business process management (BPM) defines the different activities of an organization or a business group used to implement and complete specific processes. After a process is in place, additional steps can be performed to improve and optimize its flow and performance. In broad terms, the main activities that constitute business process management can be divided into four top categories: design, implementation, execution, and monitoring. A business process management system can provide a collection of software tools that together can be used to model, implement, run, monitor, and optimize a business process.

Business processes are a part of the day-to-day operations and services of any corporation. Some examples of processes include applying for a house loan (e.g. loan origination process), starting a mobile phone service (account initiation process), hiring a new employee (employee on-boarding process), building a new jet engine (parts and assembly process) as well as countless other processes performed by enterprises and organizations in order to accomplish specific goals. Processes can range from very simple to highly complex and sophisticated, involving numerous decisions, tasks and activities.

The term process, as used in this specification, is a set of activities which collectively realize a business objective. The business process can be thought of as the process-driven application, with the model and all the integration, presentation, and logic. A typical process includes a logical flow with associated roles and systems. It is modeled, tested, and simulated within the process designer component of the business process management (BPM) system. Each process can have associated therewith a process definition, which provides the representation of the business process in a form that supports automated manipulation, such as modeling or enactment by a process execution engine or a web service. The process definition contains a set of related activities and their relationships, as well as criteria to indicate the start and termination of the process, and information about the individual activities, such as roles, systems, and user interface forms. In one embodiment, the process definition is contained in an extensible markup language (XML) file and can be read, executed, monitored and manipulated by a process designer, execution engine or other components of the BPM system.

Business process can be designed with a process designer and executed with a BPM execution engine, along with client applications, management tools, and other components, to interact with it. All of these modules can be included within the BPM system. Additionally, if a business process invokes web services, reads from a custom database, or uses Enterprise JavaBeans (EJBs), it may be necessary to ensure that these services are available in order to enable the application to work as expected.

In one embodiment, a process includes a set of activities, where each activity represents a single piece of work that forms a different step of the process. The various steps are linked together through transitions. Activities can be user-interactive or they can be totally automated. An activity can also include a series of tasks to complete that activity. For user-interactive activities, a role can be defined to identify which user is allowed to interact with the process at each point.

When a business process is executed by an engine, it forms a specific process instance. A process instance is the representation of a single enactment of a process, or an activity within a process, including its associated data. In one embodiment, each instance represents a separate thread of execution of the process or activity, and will have its own internal state and externally visible identity, which may be used, for example, to record or retrieve audit data relating to the individual enactment, such as a particular purchase order number, as opposed to the general purchase order process. Instances can start at the Begin activity of the process and finish in the End activity. The path the instances take can depend entirely on the data of the instance and the external environment.

FIG. 1 is an illustration of an exemplary business process management system, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, a business process management system can include a set of software modules that can be accessed via a network 128 (e.g. the internet), by various users 102, 104, 106, 108. The network 128 can include wired or wireless communication-based, radio frequency (RF)-based, satellite, microwave or any other form of communication network where exchange of data is enabled between the components connected thereto. In various embodiments, the BPM system includes an interface layer 110, such as a graphical user interface (GUI) accessible via a website or portal, for allowing a user to design, manipulate, execute and monitor the performance of various processes. Furthermore, the system can include a security layer 112 that enables user authentication and authorization of services to the system.

In one embodiment, the BPM system includes a catalog manager 114 that is used to define and specify the components or programs that are called from a business process. These BPM components can include compiled software programs, classes or routines that are stored by the catalog manager in a data repository 126. In one embodiment, the catalog manager defines, describes and organizes the software components.

The process designer module 116 can be used to draw and design business process models by the users of the BPM system. Once the process is designed by using the process designer, its definition file can be generated and stored on a local or remote computer. The designer can also publish the created business processes. Once the designed business process is published, it can be stored into the data repository 126 and can later be deployed to an execution engine 122, 124 for executing.

The execution console 118 can be used by various users of the system in order to manage any of the execution engines 122, 124 which have process instances executing thereon. In one embodiment, the execution engines are used to deploy the published business processes, execute tasks by the users, and perform automatic business process activities and perform any other tasks needed by each activity of the process instance. The execution engines 122, 124 can manage the execution of each process instance. One example of such process instance is processing a specific sales order using a general business process for processing sales orders. The execution engine can retrieve and collect business process definitions from the repository, manage the execution of a particular user-interactive task or automatically execute the task if it is automated.

A BPM server can maintain the state of each executing process instance in the repository 126. A repository can include a relational database management system (RDBMS), file storage, content management systems as well as any other form of data storage systems. During the execution of the instance, persistent variables can maintain the values for each activity/task of the specific process instance. These variables can be stored in the repository and can be associated with the specific process instance.

In various embodiments, persistent variables can include instance variables and argument variables. Instance variables can record values that may be passed from one activity of a business process to another activity within the same business process. As such, instance variables maintain the state of the instance within the context of the business process. Argument variables, on the other hand record values that may be passed from one business process or instance to another business process or instance.

In various embodiments, the BPM system illustrated in FIG. 1 can have a multitude of different users. As an illustration, user 102 may be a business designer person that uses the BPM system to design the various processes desired by an enterprise. Users 104 and 106 can be employees of the enterprise which are responsible for executing the various activities of the business process instance. For example, user 104 can be a salesperson that receives a sales order, verifies it for completeness and enters it into the system. User 106 may be a supervisor who validates or otherwise resolves any exceptional situations that may occur. User 108 can be an administrator of the BPM system, responsible for monitoring and improving the performance of the business processes executing on the engines.

Each user or sets of users can be assigned to a particular role. In one embodiment, a role is a job function in a process that has associated activities to be performed by a user or group. Users and/or groups can be associated with process roles in the process administrator utility. A business process can include an abstract role that is used at design time to represent abstract user sets which will represent the persons in an organization responsible for performing the various activities of the process. Subsequently, the abstract role can be matched to an organizational role based on values that correspond to the actual users of the organization. As such, the organizational role can be parametric, by being assigned a value that corresponds to user sets and can take on multiple values that correspond to different user sets. The use of abstract roles enables a business process to be designed once and deployed to several different organizations, by specifying the organization-specific users and other parameters via the organizational settings module 120.

Figure 2:
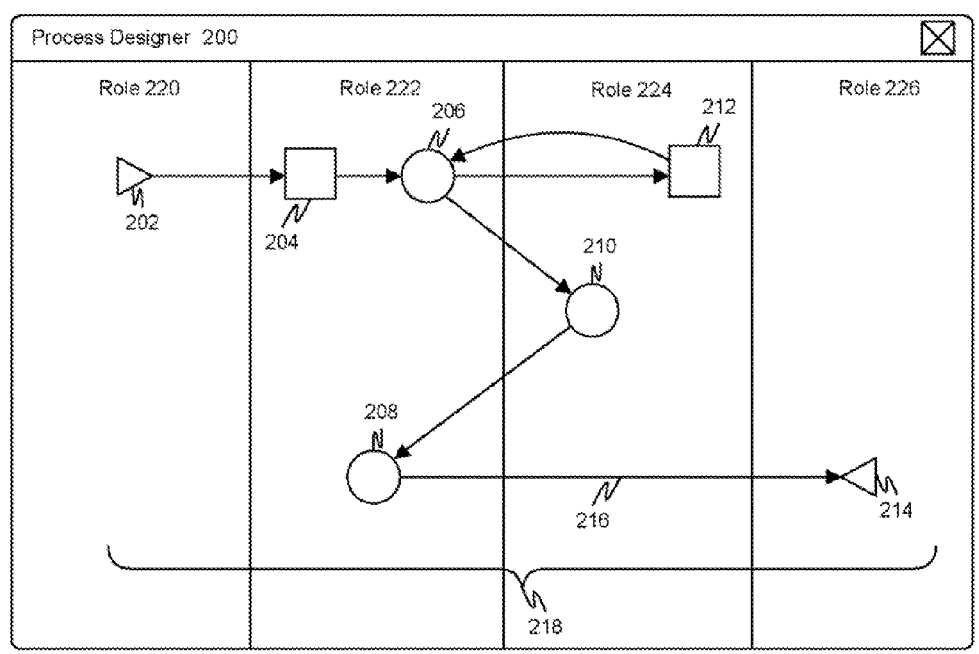
FIG. 2 is an exemplary illustration of an interface screen used to design and manipulate business processes, in accordance with various embodiments.

FIG. 2 is an exemplary illustration of an interface screen used to design and manipulate business processes, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, a process 218 can be designed by manipulating graphical icons of the Process Designer 200. Custom colors and shapes can be used to designate the various activities, tasks and transitions of the business process. In one embodiment, a process includes a set of activities connected by one or more transitions 216. The set of activities can include a Begin activity 202 and an End activity 214 used to initiate and finish the execution of the business process respectively. Furthermore, each activity can be fully automated or can require user intervention. In one embodiment, fully automated activities 204, 212 can be illustrated as square-shaped icons, while those activities 206, 208, 210 involving human intervention can be illustrated by circular shaped icons.

The sequence of activities can be coupled by transitions such as transition 216. The transitions can be used to indicate which activity or activities are to be initiated after the completion of the current activity. Either one, multiple or no activities can be invoked after completion of each activity. In one embodiment, the number and invocation of the next activities depends on the data evaluated and decisions made during the current activity.

The business process 218 can be designed by using one or more roles 220, 222, 224, 226. At design time, these roles can be abstract roles so as to enable the use of the defined process with multiple organizations. At runtime, the abstract roles can be matched to organizational roles, with specific user sets filling each role. In one embodiment, the activity is placed in a particular role column, as illustrated in FIG. 2. The user that satisfies the role can be permitted or required to perform the various tasks of that activity. For example, the users assigned to role 222 can perform the tasks associated with activities 206 and 208 and users assigned to role 224 can perform the tasks associated with activity 210.

As one illustration, the business process 218 can be comprised of a sequence of activities for processing a sales order. Each activity could comprise its own series of tasks. For example, an activity that notifies a client of an incomplete sales order may include the task of sending a notification email message and a task of placing a telephone call to the customer. The activity of approving a sales order may include checking against a database whether the product is in stock.

It should be noted that the specific business process shown in FIG. 2 is provided purely for illustrational purposes and is not intended to limit the invention. The BPM system can be used to design, execute and monitor a wide variety of business processes, ranging from very simple to highly sophisticated. Furthermore, it should also be noted that the particular graphical symbols used to illustrate each activity or transition are also provided purely as examples and any alternative symbols could be used within the scope of the various embodiments described herein. In some scenarios, the symbols could also be made configurable by a user or administrator of the system.

In various embodiments, the set of activities of a business process can include one or more decision activities. A decision activity is a construct that can allow a process designer the ability to track certain process variables and make process flow decisions based on these variables. Over time, the decision activity can learn about the decisions and be able to offer a degree of certainty for suggesting a decision based on similar data or even escalate when going against past history.

The decision activity can be added to the existing BPM modeling activity or icon list, as discussed above. The rationale for adding such an activity is to provide an easy to use construct in business processes where a business owner or business analyst can identify the data relevant to a particular business process to be presented to the end user. The end users can be presented with a set of possible decision alternatives or options. The user can decide amongst these options based on the business process-relevant data. The selected option can dictate the outbound transition through which the instance will follow. Each possible outbound transition is associated to a unique option or alternative in the decision activity. The execution engine can then start capturing the decisions taken by end users over time and begin providing probability percentages for the available options or alternatives based on previously taken decisions. These probabilities can also be associated with a confidence level that can help the end user to complete the step with more accuracy.

Figure 3:
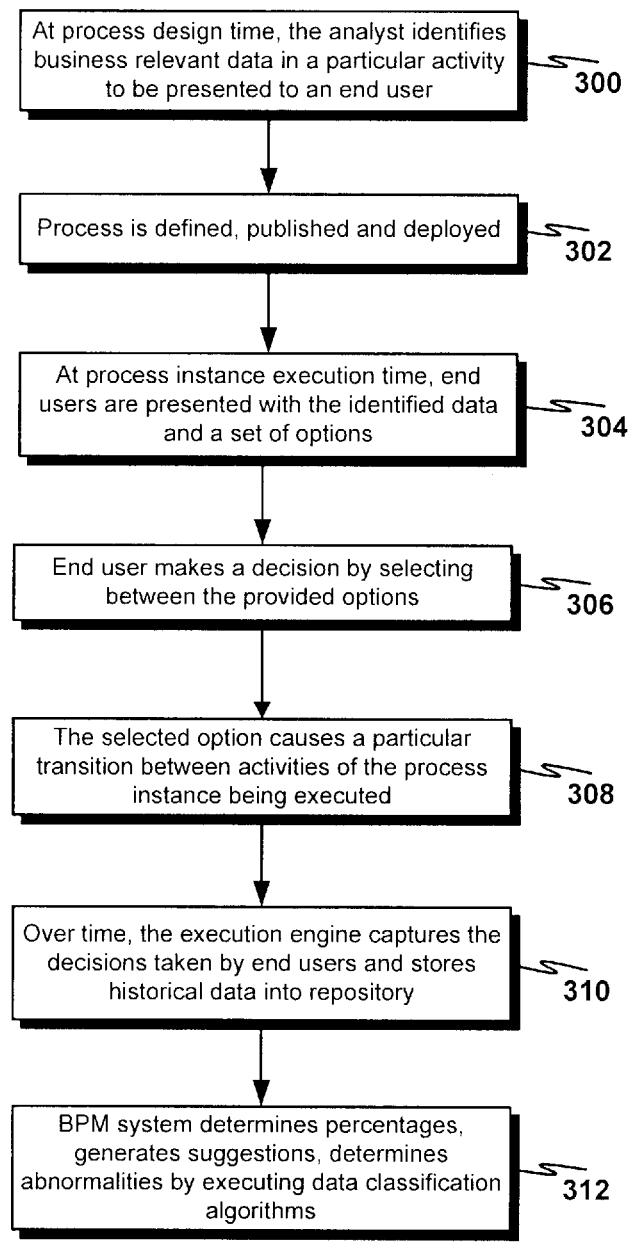
FIG. 3 is an exemplary flow chart diagram of a process implementing decision activities, in accordance with various embodiments.

FIG. 3 is an exemplary flow chart diagram of a process implementing decision activities, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 300, at process design time, a user such as an analyst can identify a set of data relevant to making a particular decision of an activity. In one embodiment, this identifying can occur during the definition and construction of the process using the graphical user interface as illustrated in FIG. 2. Once the process is defined, it can be stored into the repository for deployment and execution. It should be noted that in alternative embodiments, business relevant data can be identified at various other times, such as after publication, after deployment of the process or during modification of an existing deployed process.

The process can be executed by an execution engine, as shown in step 302. In one embodiment, execution of the business process involves instantiating a process stored in the repository with organization-specific settings and data. During process execution time, end users can be presented with the identified relevant data and a set of options from which a decision should be made, as shown in step 304. In one embodiment, the user interface rendered to the user includes the selected business and process variables, as well as all possible options (classes or categories) along with their percentages. Business variables and instance variables values can be shown for the end user to select the desired class. In one embodiment, the different possible classes can be preferably presented in the form of buttons. Certainty percentages can be placed next to the selected widget for the output class or category. A general certainty or confidence level can also be presented to the end user to enforce the given percentages given all available options. In one embodiment, the business variables are shown by the process designer, while the instance variables are shown during the execution of the process. In some embodiments, it may be desirable to make sure that all possible outcome categories are completely represented by the outgoing transitions from the decision activity.

In step 306, the end user can make a decision by selecting between one of the options rendered to him/her on the execution interface. The user can perform this action by clicking on a button displayed on a portal, website or some other interface screen. In one embodiment, the decision (selected option) causes a particular transition between activities of the process instance being executed, as illustrated in step 308. In other words, by making a decision, the end user can cause the business process instance to take a particular path such as by following a transition to another activity.

Over a course of time, the execution engine can capture the decisions taken by end users and storing this historical data into the repository, as shown in step 310. In one embodiment, historical data storage is versioned automatically, based on a compatibility criteria plus process/activity information in order to avoid mix-ups.

In step 312, the BPM system can execute various data classification algorithms in order to determine percentages, generate suggestions, determine abnormalities and perform other functions. In one embodiment, support vector machines (SVM) can be used as the data classifier, using a radial basis function (RBF) kernel. Support vector machines are a set of machine learning methodologies for classifying data based on some training information. In one embodiment, the historical data collected by the process execution engines can be entered as training data into the support vector machine in order to produce some functionality, such as calculating percentages, making suggestions or various other results. It should be noted that the present invention is not limited to the support vector machine and that various other data classification algorithms and techniques can be implemented instead.

By using advanced pattern recognition and classification, the BPM system can predict a decision that an expert would make in many (or most) of the cases. This knowledge can then be used to (1) suggest an appropriate decision; (2) allow experts to decide that some decisions can be processed automatically if the prediction accuracy is above a certain rate; (3) detect the criticality of certain decisions, and if the decision is simple enough, assign it to the expert that is less qualified, saving on precious resources of the "most expert" participants; and (4) trigger exceptions when certain decisions deviate too much from the norm (abnormal behavior).

Use Cases

The following are a set of example use cases for decision activities within an organization. It is important to note that these use cases, which are described purely for illustration purposes, are not intended to be limiting to the invention, and that numerous other use cases are also possible and will be readily apparent to one of ordinary skill in the art.

As one illustration use case, a business organization may have a Loans application to which a decision activity can be added and this decision activity can be based on a customer's credit score. When the loan request reaches the decision maker, the process advises the decision maker that based on current data stored in the instance, 75% of cases with the same data have been approved, 15% have been rejected and 10% have gone through another path in the system. This information can be used by the system or by the decision maker in various ways.

In one embodiment, the suggestion can be presented to the user as percentages on the buttons used to make the decision. In some embodiments, the information can be presented even for cases which have not been seen on previous executions. This means that if a particular combination of information has not been seen before, the activity can still show hints on which course of action is most likely. This can be accomplished by checking how similar the relevant information is to previous decisions.

In various embodiments, the mechanism used by the decision activity has other uses, such as detecting abnormal or suspicious behavior. As an example scenario, an organization may have several junior level approvers and a senior approver. The senior approver person normally only handles large accounts, where the junior approvers handle the rest. One of the junior approvers on a particular loans approves it. By using the decision activity mechanism, the process of the BPM system detects that similar cases have most of the time been rejected (e.g. 80% of the similar cases have been rejected). Based on this information, the process can route the instance to the senior approver for confirmation. Based on this information, the senior approver can either confirm the choice of the junior approver or take corrective measures. In a similar manner, anomalies on the behavior of a single senior approver among its peers could be escalated to the approval manager for review, where the manager can use this information to check the criteria used for approvals and take corrective actions if necessary. In this case, the process can teach the real evolution of the loan requests and allow the business to gather more information and take corrective actions.

Figure 4:
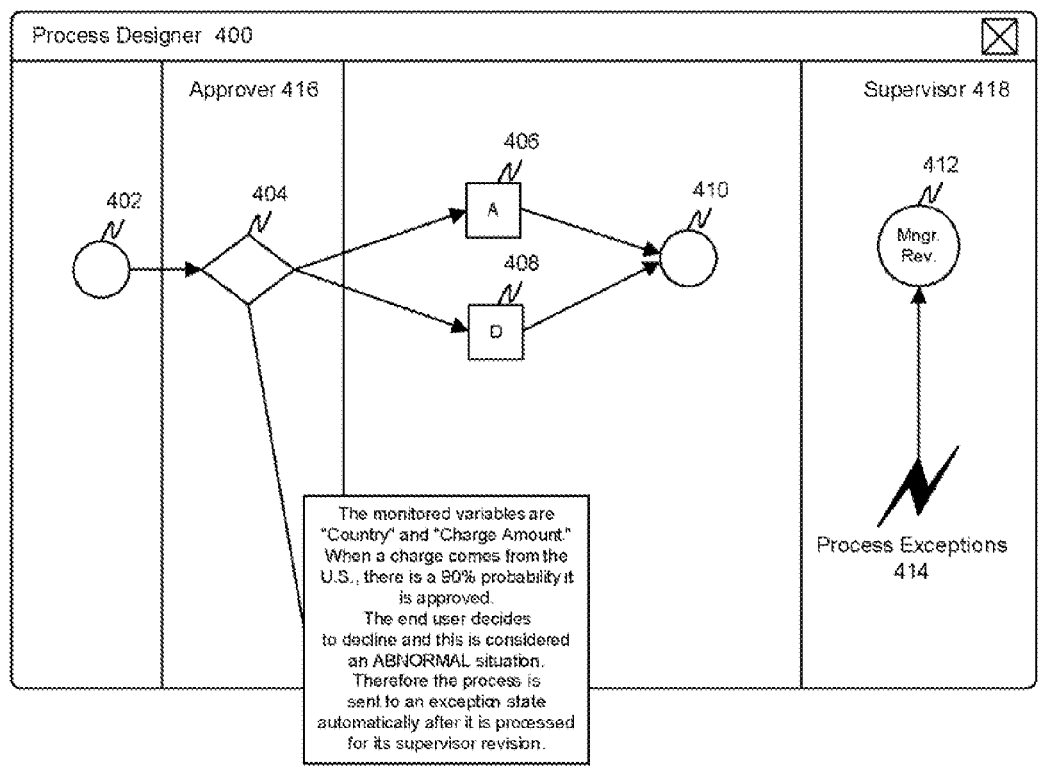
FIG. 4 is an illustration of an exemplary use case for decision activities, in accordance with various embodiments.

FIG. 4 is an illustration of an exemplary use case for decision activities, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

Given a particular process flow with certain defined variables, if there is a change of the usage pattern, an exception could be generated by the system. An example of this can occur in a credit card industry. A user may normally use his or her credit card in the United States. Thus if there is an entry from Hong Kong, a flag (exception) could be raised. Also, if the situation is reversed—a transaction from Hong Kong gets approved—there should be a flag that the approval was given to the transaction.

As illustrated in FIG. 4, a process designer 400 interface can include a number of role columns such as the Approver role 416 and the Supervisor role 418. Alternatively, these columns can be abstract roles, as previously discussed. In one embodiment, a process can begin at the Begin activity 402. A decision activity 404 can be added to the process designed on the BPM system. A set of business relevant data can be defined for the decision activity, such as the "Country" variable and the "Charge amount." These variables can be defined by the user of the process designer module, as being of particular relevance to the decision activity of the specific process being defined.

Upon reaching the decision activity, a set of options can be presented, which, when selected, cause the process to take a certain path, i.e. transition to another activity of the process. As shown, the decision activity 404 can have a transition to the approve activity 406 and a transition to a deny activity 408. The process can end at the End activity 410.

As illustrated, if cases coming from the United States are approved with 90% probability and an end user nevertheless decides to decline the request, the situation can be flagged as being in ABNORMAL state and a process exception 414 can occur. In one embodiment, upon such an exception, the process can be sent for a manager revision 412 for review. It is noted that the percentages used here represent the probability of a choice given the presented values, not necessarily the percentage of occurrences with a given characteristic. To illustrate, if 90% of cases coming from the United States are approved, there may be at least three possible scenarios that exhibit this behavior (assuming that only "Country" and "Charge amount" are used for the decision):

1. Low "Charge amounts" originate in the US, and that's why they are approved. In such a scenario, the "Charge amount" would outweigh the relevance of the country, if a low "Charge amount" is what is considered for approval.
2. If the charge amounts are somewhat evenly distributed, the country might be the deciding factor in the decision.
3. 90% of the charges originate in the US, and only 10% from other places.

In all three scenarios illustrated above, the decision activity can correctly infer any correlation that might be present between approval and the values of "Charge amount" and "Country".

Figure 5:
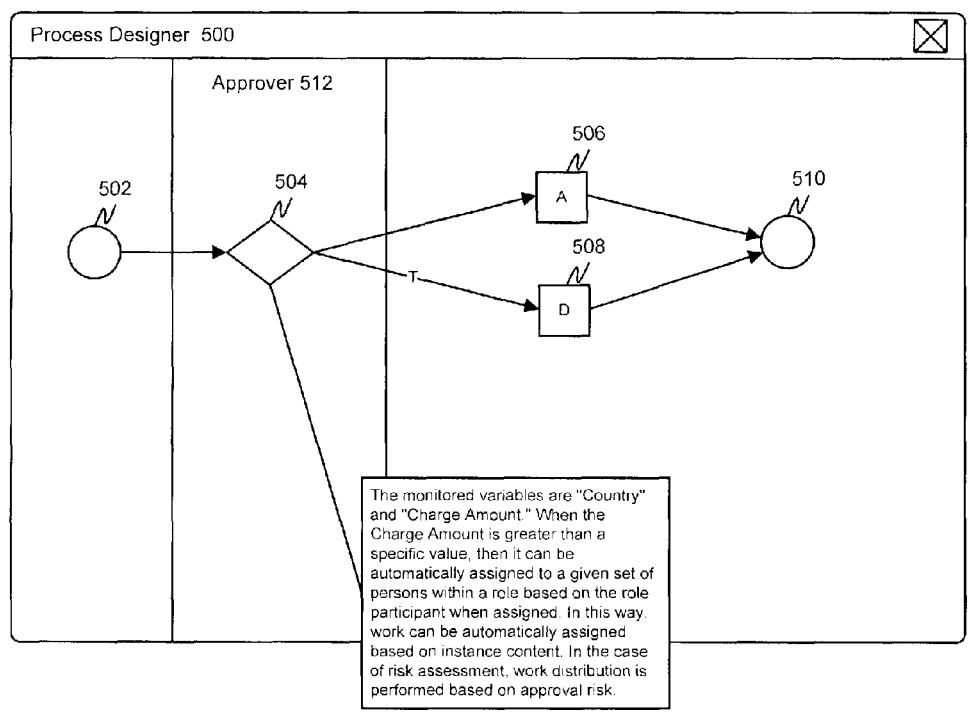
FIG. 5 is an illustration of an exemplary use case for decision activities, in accordance with various embodiments.

FIG. 5 is an illustration of an exemplary use case for decision activities, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

Decision activities can also be used in work distribution, automation and exception cases. As illustrated, the process designer 500 can include an approver role 512 column in which a decision activity 504 can be created. In this embodiment, the relevant process variables are also "Country" and "Charge Amount." The decision activity 504 can be a part of the process that begins at the Begin activity 502 and completes at the End activity 510. Similarly, to the process in FIG. 4, the decision activity 504 can have two transitions, one linking to an approve activity 506, the other linking to a deny activity 508.

Additionally, work distribution can be based on how "easy" the decision is. To illustrate, an activity can have three possible decisions Approve, Reject, and Review. Further, the following probabilities can be captured for different cases:

1. Approve: 83%, Reject: 7%, Review: 10%
2. Approve: 3%, Reject: 86%, Review: 11%
3. Approve: 42%, Reject: 7%, Review: 51%

Cases 1 and 2 can be considered easy, since in both there are decisions with high confidence (in case 1 approve with 83%, in case 2 reject with 86%). But in case 3, there may be no single choice that has a high enough probability, so it might be better to send it to the senior approver. Thus, based on values associated with the set of variables, automatic work distribution could be enabled to properly assign instances to a particular role participant. For example, if the BPM system determines that it cannot make the classification with a high level of certainty (i.e. the decision being made is "hard"), the activity could be automatically directed to a senior supervisor, while decisions with a high confidence level can be distributed to junior lower level approvers. In this manner, automatic risk work distribution can be performed for a process, based on specific instance content data.

Figure 6:
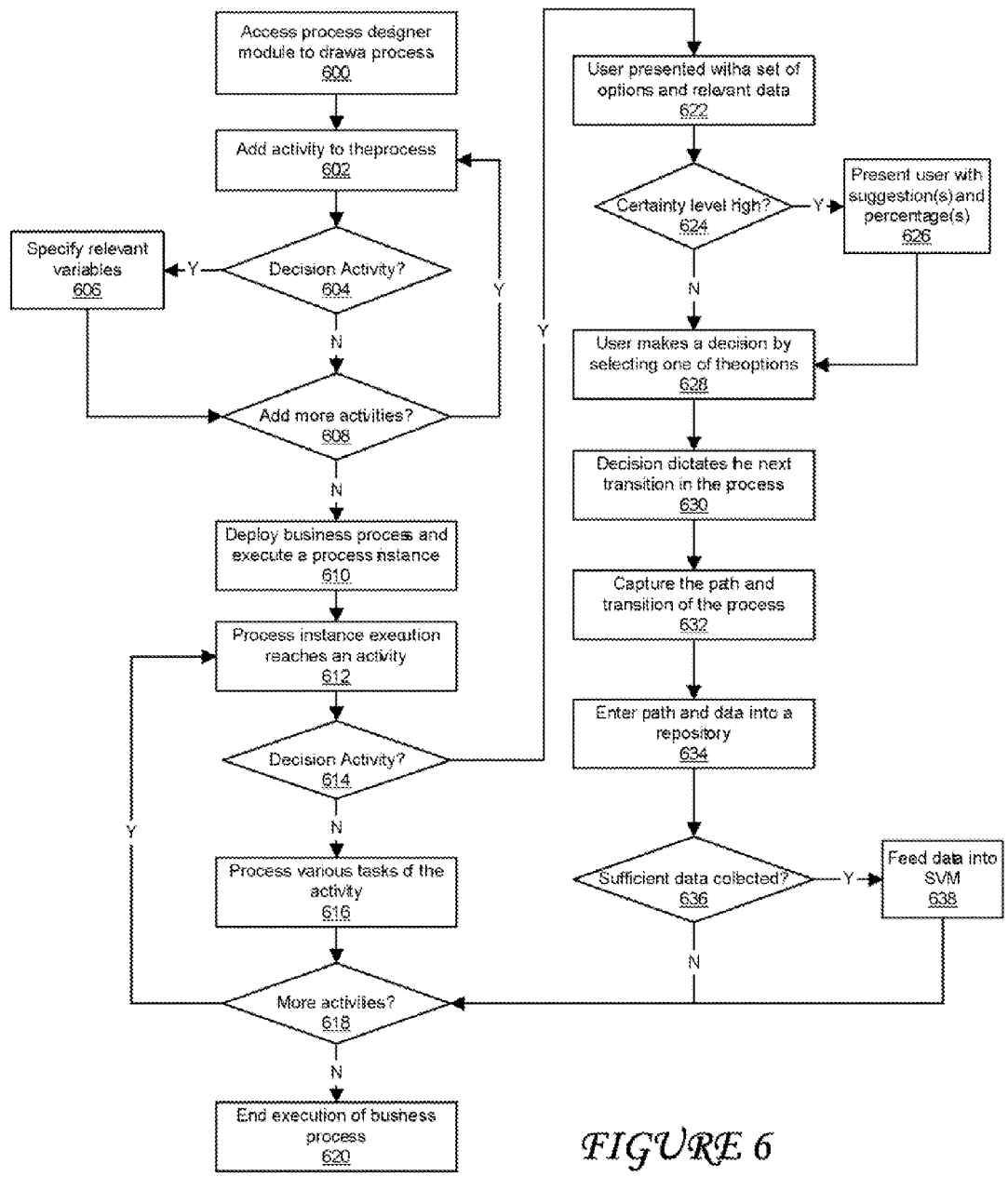
FIG. 6 is an exemplary summarized flow chart diagram of process design and execution by implementing decision activities, in accordance with various embodiments.

FIG. 6 is an exemplary summarized flow chart diagram of process design and execution by implementing decision activities, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated, a process designer module can be used 600 by a business analyst to draw a process model, from which a process will be generated and deployed. An activity can be added to the process model in step 602. In step 604 the system can determine whether the newly added activity is of a decision activity type. If it is, the process designer can require the user (business analyst) to specify the relevant variables and data that will be associated with making a decision for this activity. As an example, the customer's income variable may be relevant in making a credit approval decision.

Once the variables are specified, the process designer can continue on with adding more activities 608 to the process model, if any. Once all of the activities for the particular process have been specified, the business process can be published, deployed and executed 610. In various embodiments, once the process is executed, it becomes a process instance containing its own specific data and variables.

In step 612, the execution of the process instance reaches an activity. The tasks of the activity can then be executed and performed, as shown in step 616. If the activity that the process has arrived at is a decision activity 614, then several additional steps can be performed.

In step 622, the user can be presented with a set of options and the business relevant variables from which he can make a decision. If the certainty level of the data classifier (e.g. SVM) is high enough, as determined in step 624, the user can be provided with a suggestion and/or percentage of prior decisions and their outcomes 626.

In step 628, the user makes a decision by selecting one of the available options provided. The user's decision dictates the path that the process will take. In other words, the user's decision will indicate the transition to the next activity of the process 630. Upon receiving such a selection, the BPM system can capture the process path and transition data 632 and store that data into a repository 634. Once sufficient data has been collected in step 636, it can be fed into the data classifier such as the support vector machine (SVM) 638. In various embodiments, the BPM system can obtain a set of prior results, percentages and suggestions from the SVM, as well as the level of certainty of those results. If that level of certainty is high enough (e.g. as determined by the process designer), the suggestions and percentages can be provided to the user upon the next instance of the decision activity.

The execution of the process instance can continue in this manner until there are no more activities left, as determined in step 618. Once it has been determined that there are no more activities, the execution of the particular instance can end, such as by reaching an End activity.

Various embodiments previously described include a computer program product which is a storage medium (media) having instructions stored thereon/in and which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments and containers, as well as user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing decision activities in a business process management environment, said system comprising one or more hardware processors and physical memory storing one or more sequences of instructions executable by said one or more hardware processors to implement:
   a process designer module that defines a process model, said process model including a plurality of activities linked by transitions;
   wherein said activities include at least one decision activity for providing suggestions based on historical data, said decision activity being selected from the plurality of activities during definition of the process model, wherein said decision activity is associated with a set of variables during the definition of the process model, wherein said variables are designated as being relevant to selecting one of the transitions from the decision activity to another activity at process runtime; and
   an execution engine that instantiates a process instance by executing at least one of said activities of the process model, wherein upon instantiating the process instance, the execution engine displays to an end user a plurality of selections for selecting a next activity in the process and displays the set of variables relevant to selecting the next activity, wherein the execution engine receives the selection of the next activity from the end user, wherein the execution engine continuously captures a plurality of said selections taken by the end user during execution of a plurality of process instances, and wherein upon a subsequent execution of the process instance, the execution engine computes a probability percentage and a confidence level for each of the plurality of selections of the next activity from the decision activity based on values of the variables in said subsequent process instance and based on said selections captured from the end user during the execution of the plurality of process instances.

2. The system of claim 1, further comprising:
   an execution console that manages said process instance and presents one or more end users with a set of available options for making said decision in an executed activity of said instance.

3. The system of claim 1, further comprising:
   a repository that maintains state data associated with said process instance, said state data including one or more persistent variables and said one or more decisions.

4. The system of claim 1, further comprising:
   an organizational settings module that populates said process model with organization-specific values in order to instantiate said process instance.

5. The system of claim 1, further comprising:
   a data classifier module for analyzing said data, wherein the execution engine enters data associated with said decisions into said data classifier module.

6. The system of claim 5 wherein said data classifier module is a support vector machine using a radial basis function kernel.

7. The system of claim 1 wherein said suggestion is based on a percentage of previous decisions made in instances of said process.

8. The system of claim 1 wherein an exception is generated upon determining a deviation from the norm based on previous decisions.

9. The system of claim 1 wherein work is automatically distributed by said system based on data specific to said process instance.

10. A method for providing decision activities in a business process management environment, said method comprising:
    defining a process that contains one or more activities linked by transitions;
    designating at least one of said activities as a decision activity during the definition of the process, wherein the decision activity is associated with process-relevant data presented to one or more end users that is relevant to selecting one of the transitions from the decision activity to another activity at process runtime;
    instantiating a process instance by executing the process on a computer including one or more microprocessors wherein upon instantiating the process instance, a plurality of selections is displayed to an end user for selecting a next activity in the process and the set of variables relevant to selecting the next activity is displayed to the end user;
    receiving selection of at least one of said set of possible options wherein said decisions determine the transitions through which the process instance proceeds;
    continuously capturing said one or more decisions taken by the end users during execution of a plurality of process instances, wherein upon a subsequent execution of the process instance, a probability percentage and a confidence level is computed by the computer for each of the plurality of the selections of the next activity from the decision activity based on the values of the variables in said subsequent process instance and based on said selections captured from the end user during the execution of the plurality of process instances.

11. The method of claim 10 wherein generating a suggestion based on said decisions and providing said suggestion to said end users further includes:
    calculating one or more probability percentages of prior decisions taken over said period of time an displaying said probability percentages to the end user.

12. The method of claim 11 wherein generating a suggestion based on said decisions and providing said suggestion to said end users further includes:
 determining a certainty level of said probability percentages.

13. The method of claim 10, wherein identifying said process-relevant data further includes:
 seeding an initial value of said suggestion; and
 determining an effect of said initial value over the period of time by comparing said initial value against said decisions captured over the period of time.

14. The method of claim 10 wherein generating a suggestion based said decisions and providing said suggestion to the end users further includes:
 determining a deviation from a standard procedure based on prior decisions.

15. The method of claim 14, wherein determining a deviation further includes:
 generating an exception within said process instance based on said deviation.

16. The method of claim 10 wherein said relevant data and said decisions are stored into a content repository.

17. The method of claim 16 wherein said data classifier mechanism is a support vector machine using a radial basis function kernel.

18. The method of claim 10 wherein capturing said one or more decisions further includes:
 entering said decisions into a data classifier mechanism.

19. The method of claim 10, further comprising:
 distributing workload of said process based on process instance-specific content.

20. A non-transitory computer readable storage medium storing a set of instructions which when executed by one or more processors, cause the one or more processors to perform steps comprising:
 defining a process that contains one or more activities linked by transitions;
 designating at least one of said activities as a decision activity during the definition of the process, wherein the decision activity is associated with process-relevant data presented to one or more end users that is relevant to selecting one of the transitions from the decision activity to another activity at process runtime;
 instantiating a process instance by executing the process wherein upon instantiating the process instance, a plurality of selections is displayed to an end user for selecting a next activity in the process and the set of variables relevant to selecting the next activity is displayed to the end user;
 receiving selection of at least one of said set of possible options wherein said decisions determine the transitions through which the process instance proceeds;
 continuously capturing said one or more decisions taken by the end users during execution of a plurality of process instances, wherein upon a subsequent execution of the process instance, a probability percentage and a confidence level is computed for each of the plurality of the selections of the next activity from the decision activity based on the values of the variables in said subsequent process instance and based on said selections captured from the end user during the execution of the plurality of process instances.

* * * * *

UNITED STATES PATENT AND TRADEMARK OFFICE
CERTIFICATE OF CORRECTION

PATENT NO.        : 8,996,394 B2                                Page 1 of 1
APPLICATION NO.   : 11/937390
DATED             : March 31, 2015
INVENTOR(S)       : Nores et al.

It is certified that error appears in the above-identified patent and that said Letters Patent is hereby corrected as shown below:

In the Claims
In column 14, line 66, in claim 11, delete "an" and insert -- and --, therefor.

Signed and Sealed this
Third Day of November, 2015

Michelle K. Lee
*Director of the United States Patent and Trademark Office*